(12) United States Patent
Aram et al.

(10) Patent No.: US 6,600,130 B1
(45) Date of Patent: Jul. 29, 2003

(54) METHOD AND DEVICE FOR PROVIDING A LAYER TO A PISTON RING

(75) Inventors: Mehdi Aram, Partille (SE); Hans Sundén, Brännö (SE)

(73) Assignee: Koncentra Verkstads AB, Göteborg (SE)

( * ) Notice: Subject to any disclaimer, the term of this patent is extended or adjusted under 35 U.S.C. 154(b) by 0 days.

(21) Appl. No.: 10/110,965

(22) PCT Filed: Nov. 8, 2000

(86) PCT No.: PCT/SE00/02178

§ 371 (c)(1),
(2), (4) Date: Apr. 18, 2002

(87) PCT Pub. No.: WO01/34875

PCT Pub. Date: May 17, 2001

(30) Foreign Application Priority Data

Nov. 9, 1999 (SE) ................................................. 9904040

(51) Int. Cl.⁷ ............................................... B23K 26/34
(52) U.S. Cl. ................................................ 219/121.63
(58) Field of Search ...................... 219/121.63, 121.64, 219/121.65, 121.66, 121.61, 121.62, 121.78, 121.79, 121.82, 159; 427/576, 597, 596; 29/888.074, 888.07; 277/444

(56) References Cited

U.S. PATENT DOCUMENTS

| 3,575,433 A | | 4/1971 | Beyer et al. |
|---|---|---|---|
| 4,218,494 A | | 8/1980 | Belmondo et al. |
| 4,299,401 A | * | 11/1981 | McCormick ................. 277/440 |
| 4,756,841 A | | 7/1988 | Buran et al. |
| 5,405,660 A | * | 4/1995 | Psiuk et al. .................. 427/597 |
| 6,127,046 A | * | 10/2000 | Worden et al. .............. 428/612 |
| 6,316,065 B1 | * | 11/2001 | Wallmann .................... 427/596 |

FOREIGN PATENT DOCUMENTS

| DE | 24 33 814 | 1/1976 |
|---|---|---|
| EP | 0 094 759 | 11/1983 |
| GB | 2 313 171 | 11/1997 |
| JP | 56136294 | 1/1982 |

* cited by examiner

*Primary Examiner*—Tom Dunn
*Assistant Examiner*—Jonathan Johnson
(74) *Attorney, Agent, or Firm*—Burns, Doane, Swecker & Mathis, L.L.P.

(57) ABSTRACT

The present invention relates to a method for applying a layer to a piston ring blank, in particular for a piston ring of the kind that is intended for use in large diesel engines. A coating powder is supplied to one of succeeding portions of the piston ring blank, after which the coating powder is melted with the aid of an energy radiation means at a constant distance from the coating powder which was last supplied to the piston ring blank to form a coating layer on said portion of the piston ring blank. The energy radiation is allowed to act on the coating powder for a period of time which is adjusted so that substantially no heat, besides the heat required for melting the powder material develops. The invention also relates to a device for performing the method.

21 Claims, 3 Drawing Sheets

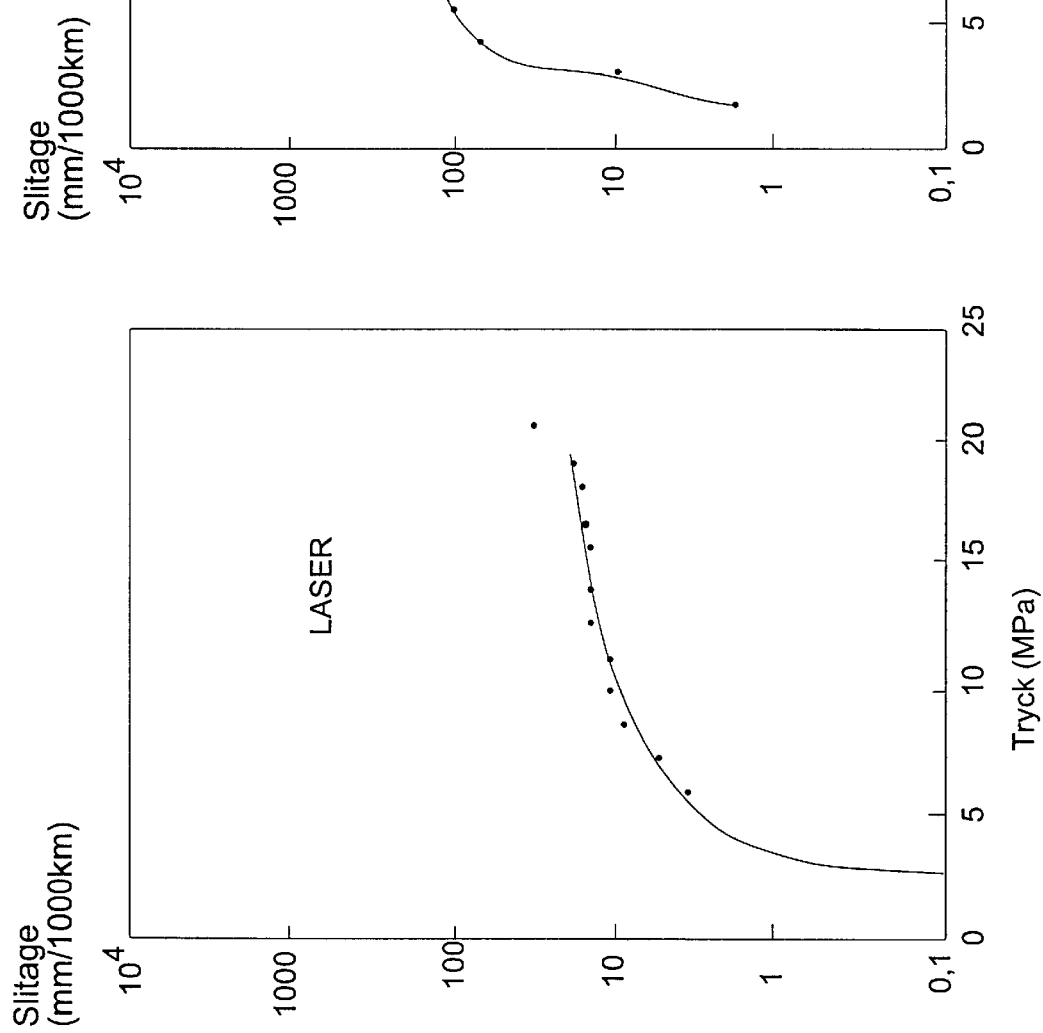

METHOD AND DEVICE FOR PROVIDING A LAYER TO A PISTON RING

FIELD OF THE INVENTION

The present invention relates toga method for applying a layer to a piston ring blank, in particular for a piston ring of the kind that is intended for use in large diesel engines.

The invention also relates to a device for performing the method.

TECHNICAL BACKGROUND

Piston rings of the kind which are preferably used in large diesel engines, for instance in boat engines, are exposed to extreme conditions during the operation of the engine. A high degree of wear, heat and corrosive attack cause the piston rings to quickly wear, thus necessitating replacement.

Many methods for increasing the service life of the piston rings have been proposed. Some of these methods are directed to the application of an abrasion-resistant layer to the most exposed portions of the piston ring, preferably its outer periphery. These wearing layers can, for instance, be applied chemically to the ring material by means of an electrolytic reaction or be welded to the same under the action of a heating means, often an energy beam.

Today a plurality of methods are available for coating a workpiece by means of an energy beam, for instance a laser beam, which heats a zone of the workpiece. In such coating, a coating powder is usually melted together with a workpiece, resulting in both the powder and some of the material of the workpiece being melted. One draw back of this method is that the material of the workpiece is subject to changes which are not desirable, such as the formation of martensite. If martensite forms under the coating layer, there is a great risk that the layer will disengage from the workpiece during use.

Another drawback of such coating is that it requires different stages of heating and cooling of the workpiece. Stresses may thus arise both in the workpiece and between the workpiece and the coating layer and affect the strength of the coating and the workpiece.

Moreover, when manufacturing piston rings, specific problems arise. A piston ring is usually formed by cutting "slices" from a cast pipe which is somewhat oval in cross-section. In one processing step, the oval rings are formed with a through slit to allow the passage of gases as well as satisfactory contact with the lining of the piston when operating the engine. The oval shape as such is difficult to handle, compared with more symmetrical shapes. The necessary stress in the material is critical to the function of the piston ring but difficult to combine with a strong, adequately attached wearing layer in the form of a coating.

The present invention aims at providing a method and a device for applying an abrasion-resistant and well-attached wearing layer to a piston ring blank.

SUMMARY OF THE INVENTION

The object of the present invention is achieved by means of a method according to the introductory part, wherein a coating powder is supplied to one of succeeding portions of the piston ring blank, after which the coating powder is melted with the aid of an energy radiation means to form a coating layer on said portion of the piston ring blank.

The energy beam is allowed to act on the coating powder, its energy being absorbed by the powder and converted into heat, which melts the powder. By using correctly chosen energy radiation, the powder is melted with a minimum effect on the piston ring blank. This melting is just enough for satisfactory welding of the coating layer and thus allows a minimisation of the Heat Affected Zone (HAZ) in the piston ring blank. This finally results in a piston ring having a strong coating layer which is firmly bound to the piston ring.

Preferably, the energy radiation is allowed to act on the coating powder for a period of time which is adjusted so that substantially no heat, besides the heat required for melting the powder material, develops. The energy radiation can be adjusted to the composition of the coating powder and the amount of powder, in which case the method can be controlled by the time of action, so that substantially only the amount of heat required for melting the powder material develops.

The energy radiation which is used to melt the powder can, preferably, be laser radiation, but also for instance plasma radiation is feasible.

According to the second aspect of the present invention, the object is achieved by means of a device for applying a layer to a piston ring blank, in particular of the kind that is intended for use in large diesel engines. The device comprises a powder feeding means, which is arranged in the vicinity of the piston ring blank for supplying a coating powder to one of succeeding portions of the piston ring blank, and an energy radiation means, which is arranged in the vicinity of the piston ring blank for melting the coating powder in said portion.

The device is preferably adapted so that the energy radiation is allowed to act on the coating powder for a period of time which is adjusted so that substantially no heat, besides the heat required for melting the powder material, develops.

The energy radiation means is preferably a laser means for producing a laser beam. This type of means is well known and relatively easy to control.

According to the method, the piston ring blank is moved preferably successively relative to the powder feeding means and the energy radiation device. After each portion of the piston ring blank, a new portion of the piston ring blank is thus successively advanced, which allows the method to be performed continuously.

Consequently, the device according to the invention is preferably provided with a driving means for relative movement between the piston ring blank and the powder feeding means as well as the energy radiation means. The driving means is then suitably arranged so that the portion of the piston ring blank first passes the powder feeding device and subsequently the energy radiation means. According to the method, the powder is applied before heating by means of the energy beam. As a result, the piston ring material is not heated more than necessary to form a coating layer by melting the coating powder. This minimum heating of the piston ring material is, as already mentioned above, the reason why the heat affected zone (HAZ) and thus the formation of martensite in the piston ring blank is minimised.

The method is suitably initiated and finished in one and the same zone of the piston ring blank, because the starting and stopping zone risks becoming uneven or irregular. By locating these zones adjacent to each other, it is possible, when manufacturing the piston ring of the piston ring blank, to choose precisely this zone to form the necessary slit. The material that is used in the finished piston ring will thus be free from stress or irregularities in the edges of the coating.

The piston ring blank is preferably rotated substantially on its own axis as the method proceeds. Suitably, the driving means can be arranged to rotate the piston ring blank substantially on its own axis. In such an embodiment, the powder feeding means and the laser device can both be arranged in a stationary manner, the piston ring blank being fed successively past them.

The energy radiation is preferably allowed to act at a constant distance relative to the coating powder which was last supplied to the piston ring blank. This results in an even energy dose which is converted into heat in the coating powder. Thus the quality of the coating layer will be even along the entire piston ring.

Preferably, the width of the energy radiation substantially corresponds to the width of the piston ring blank, and in the device the energy radiation means is correspondingly adapted to generate a laser beam whose width substantially corresponds to that of the piston ring blank. A wide energy beam during the coating method contributes to an even quality of the coating layer in the centre as well as at the edges of the piston ring portion.

The coating powder is preferably chosen so as to be of a kind having substantially the same coefficient of thermal expansion as the piston ring blank, which prevents the emergence of stress in the materials when heating and cooling. To obtain the required strength, the powder material can suitably be of a kind that forms a metal matrix comprising $Cr_3C_2$ and Mo. Suitably the powder material then contains 30–50% by weight Cr, 5–15% by weight Mo, 1.5–5% by weight C, 30–50% by weight Ni and 1.5–5% by weight W.

Suitably, the piston ring portion is pre- and post-heated by means of a plurality of heating elements. The pre- and post-heating of the blank serves to reduce the stress in the two materials resulting from excessive and rapid temperature changes. The advantage of arranging a plurality of heating elements is, among other things, that they can be controlled individually, and consequently the heating can be well controlled. In addition, this heating takes place as the method proceeds.

These heating elements are preferably evenly distributed around the circumference of the piston ring blank, which minimises the stress in the ring.

Preferably the heating elements can consist of induction coils. The use of such coils is particularly advantageous as the surface of the piston ring blank is then heated to a greater extent than its interior. As a result, the piston ring blank is not heated more than necessary for the actual coating, and thus the formation of martensite in the material is reduced.

The device preferably comprises a suspension device for the piston ring during the coating method. The suspension device comprises at least one supporting means against which a zone of the piston ring blank abuts.

Advantageously, the suspension device can be a device in which the piston ring is caused to rotate. When the piston ring blank is somewhat oval, it is particularly suitable to use a device comprising spring-loaded supporting means, which act radially outwards to the inside of the piston ring blank. Owing to this, the supporting means follows the oval shape without any difficulties. The supporting means and the heating elements can easily be arranged at the circumference of the piston ring blank without interfering with each other, for instance, in a manner such as described in the embodiment below.

BRIEF DESCRIPTION OF THE DRAWINGS

FIG. 3 is a diagram of wear tests which have been carried out, respectively, on a conventional wearing layer and on a wearing layer applied by means of the inventive method.

DESCRIPTION OF PREFERRED EMBODIMENTS

Figure 1:
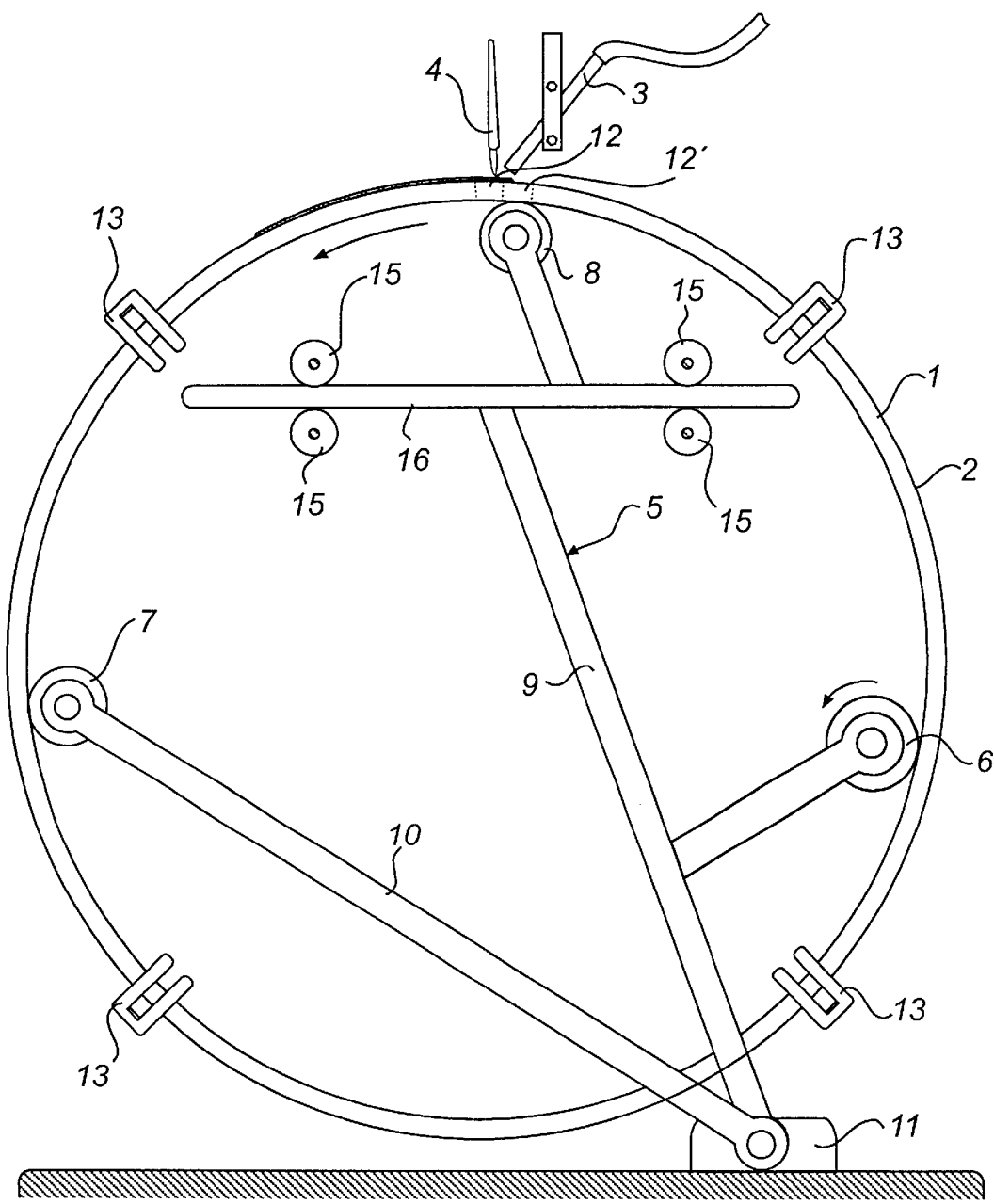
FIG. 1 shows an embodiment of a device according to the invention seen from the side.

FIG. 1 shows an embodiment of a device according to the invention. A piston ring blank 1 which is to be coated on its outside with a wearing layer is arranged in a device for coating according to the invention. The device comprises a powder feeding means 3 which is associated with a store (not shown) for coating powder. Adjacent to the powder feeding means 3, a laser device 4 is also arranged.

The piston ring blank 1, which has a somewhat oval shape, is supported by a suspension device 5. The suspension device 5 comprises three supporting means 6, 7, 8 against which the piston ring blank abuts. In this embodiment, the supporting means 6, 7, 8 are substantially cylindrical and rotatable on a respective cylinder axis. One of the supporting means 6 is connected to a driving means (not shown), for instance a motor unit, which drives this cylindrical supporting means 6 to rotate in counter-clockwise direction. Due to friction between the supporting means 6 and the piston ring blank 1, also the piston ring blank 1 is caused to rotate in counter-clock-wise direction. The supporting means are arranged on rigid arm structures 9 and 10, which in turn are arranged on a base portion 11. The first arm structure 9 is arranged on the base portion 11 via a helical spring (not shown) which strives to press the supporting means 6, 8 associated with the arm structure 9 radially outwards, which in this case means that the arm structure 9 is spring-loaded in clockwise direction. The other arm structure 10 with the supporting means 7 is spring-loaded in a corresponding manner via a helical spring in counter-clock-wise direction.

All three supporting means 6, 7, 8 thus abut against the piston ring blank, without any inconvenience being caused by its oval shape. It should also be noted that the laser device 4 is arranged just opposite one of the supporting means 8. This supporting means 8 is prevented from moving in the vertical direction, which allows the distance to be constant between the laser device 4 and the portion 12 of the piston ring blank 1 located there-under. To this end, the arm structure 9, which carries the supporting means 8, is provided with a horizontally positioned arm part 16. This part 16 is prevented from moving in the vertical direction by guide elements 15. In this case, the guide elements are four guide rollers 15 arranged in pairs. The arm part 15 can thus move freely in the horizontal direction between the pairs of guide rollers 15, but is prevented from moving in the vertical direction. As a result, the uppermost supporting means 8 is always located on the same level, and the distance to the laser device 4 is constant.

Four heating elements 13 are arranged symmetrically around the piston ring blank. The heating elements 13 are here induction loops through which the piston ring blank can rotate. The piston ring blank is continuously heated when passed through the induction loops 13 when rotating the piston ring blank 1. The induction loops 13 are evenly distributed around the circumference of the piston ring blank 1, which minimises possible stress due to temperature differences in the piston ring blank 1. As to the power supply of the induction loops 13, this can be provided either centrally, in which case all the loops 13 are supplied with the same amount of power, or individually, in which case each loop 13 can be controlled separately. The power supply is not shown in FIG. 1.

The configuration of the supporting means 6, 7, 8 and the heating elements 13, as well as their respective number, may of course vary within the scope of the invention. It should be noted how the construction of the suspension device 5 makes it possible to arrange in a simple manner both the supporting means 6, 7, 8 and the heating elements 13 in suitable positions.

Figure 2:
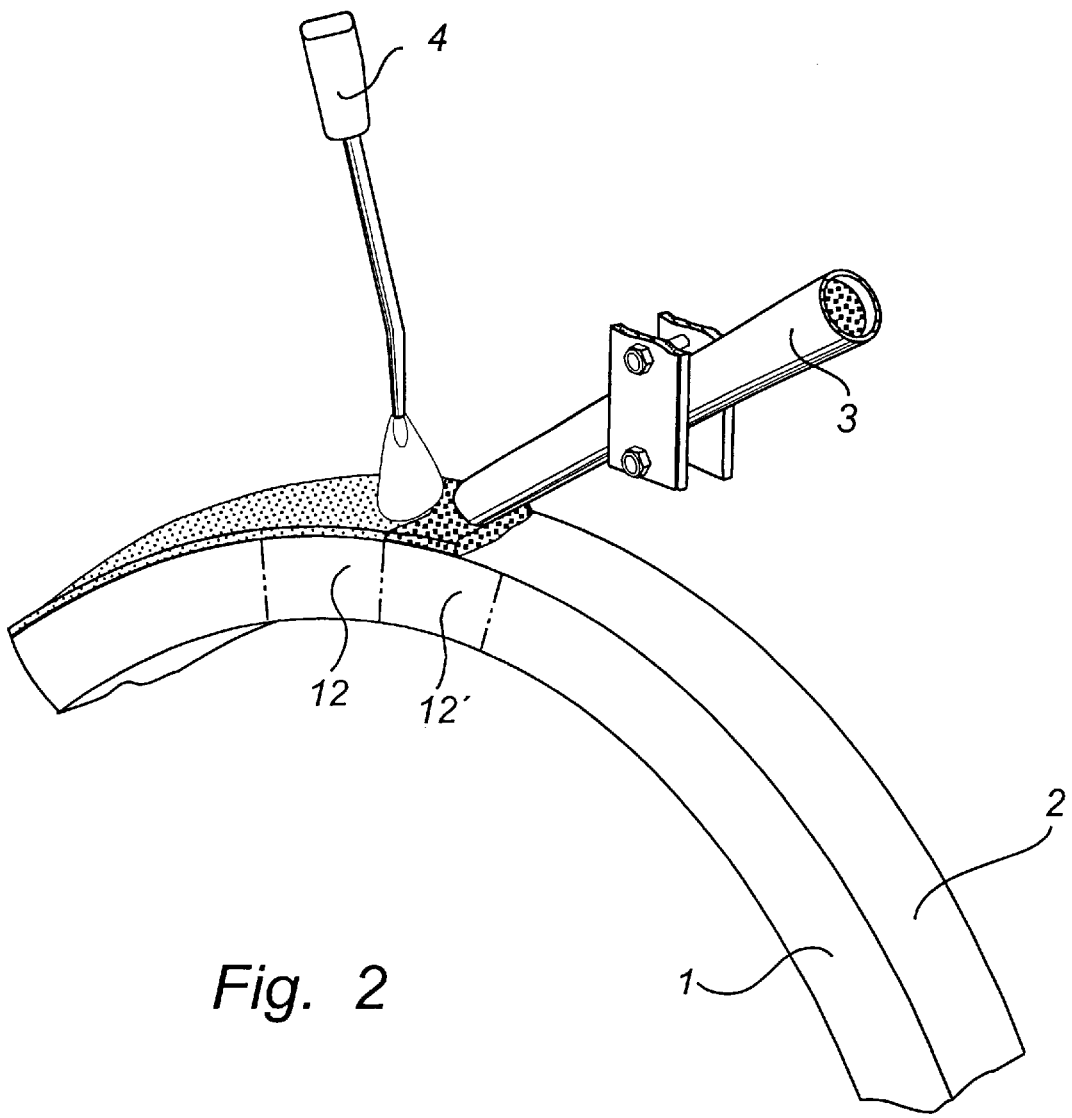
FIG. 2 is a perspective view of the embodiment in FIG. 1 showing an outer portion of a piston ring blank at which the powder feeding means and the laser device are arranged.

FIG. 2 shows in a perspective view how powder material is applied to the outer surface 2 of an imaginary zone 12' of the piston ring blank 1 with the aid of the powder feeding means 3. In the immediate vicinity and in the rotary direction of the piston ring blank 1, a laser beam is applied via the energy radiation means 4 to another imaginary zone 12. The laser radiation melts the powder material, which forms a coating that is seen in the zone 12.

An embodiment of the inventive method will now be described in connection with the function of the embodiment of the inventive device shown in FIG. 1.

During the entire coating method, the piston ring blank 1 is arranged in a suspension device 5. Before being suspended, the piston ring blank can preferably be heated in usual manner in a furnace of a suitable kind. In the suspension device, the ring abuts against the three supporting means 6, 7 and 8. The supporting means 6 is connected to a driving means, which drives the piston ring blank 1 in counter-clockwise direction substantially on its own axis. As the rotation proceeds, coating powder is applied to a portion of the piston ring 12. The rotation rapidly conveys the portion 12 to the vicinity of an energy beam that melts the powder, which forms the desired coating layer. In the meantime, the next portion 12' of the ring has been placed under the powder feeder.

Owing to this, the method can be carried out continuously. The heating at the heating elements 13 reduces stress in the ring, and the distance of each portion 12, 12' of the ring to the energy beam is kept constant with the aid of the spring-loaded supporting means 7, 8 of the device. The method is initiated and finished in one and the same portion or zone of the piston ring blank. This zone is removed when a piston ring is finally formed of the blank.

FIG. 3 shows the result of wear tests which have been carried out on a conventional coating layer 3a and an inventive coating layer 3b. It is evident from the diagrams that the coating layer according to the invention is much more resistant than the conventional layer. The conventional layer relatively quickly attains a wear limit at which the actual layer is simply destroyed. Such a limit is not even observed in the case of the layer which has been coated according to the invention, under the given conditions.

The time of action during which the laser device is allowed to act on a portion of the piston ring blank varies, for instance, with the diameter of the ring and can be controlled by the rate of rotation of the piston ring blank. It is also important to ensure that the base material keeps an even rate so that the layer will be even over the entire outer surface of the ring.

Possibly the piston ring can be pre- and/or post-heated in conventional manner in an ordinary furnace, before and after the coating method, respectively.

In this application powder material refers, in addition to conventional powder material, to materials mixed with a binder to obtain a creamy consistency, which can be advantageous when applying the powder material to the piston ring blank.

What is claimed is:

1. A method for applying a layer to a piston ring blank (1), in particular for a piston ring of the kind that is intended for use in large diesel engines, characterised in that a coating powder is supplied to one of succeeding imaginary portions (12, 12') of the piston ring blank (1) with the aid of a powder feeding means (3),
    after which the coating powder is melted with the aid of an energy radiation means (4) at a constant distance from the coating powder which was last supplied to the piston ring blank (1) to form a coating layer on said portion (12, 12') of the piston ring blank,
    the energy radiation being allowed to act on the coating powder for a period of time which is adjusted so that substantially no heat, besides the heat required for melting the powder material, develops, wherein the piston ring blank (1) is successively moved relative to the powder feeding means (3) and the energy radiation device (4), and wherein the method is initiated and finished in one and the same zone of the piston ring blank (1).

2. A method as claimed in claim 1, wherein the energy radiation is laser radiation.

3. A method as claimed in claim 1, wherein the piston ring blank (1) is rotated substantially on its own axis as the method proceeds.

4. A method as claimed in claim 1, wherein the width of the energy radiation substantially corresponds to the width of the piston ring blank (1).

5. A method as claimed in claim 2, wherein the width of the energy radiation substantially corresponds to the width of the piston ring blank (1) and the laser radiation is widened by means of double focussing optics.

6. A method as claimed in claim 2, wherein the width of the energy radiation substantially corresponds to the width of the piston ring blank (1) and the laser radiation is widened by means of line focussing optics.

7. A method as claimed in claim 1, wherein the powder material is chosen so as to have substantially the same coefficient of thermal expansion as the piston ring blank (1).

8. A method as claimed in claim 1, wherein the powder material is chosen so as to be of a kind which when melting forms a metal matrix comprising $Cr_3C_2$ and Mo.

9. A method as claimed in claim 8, wherein the powder material is chosen so as to be of a kind comprising approximately 30–50% by weight Cr, 5–15% by weight Mo, 1.5–5% by weight C, 30–50% by weight Ni and 1.5–5% by weight W.

10. A method as claimed in claim 2, wherein the laser radiation is provided by means of a continuous $CO_2$-laser.

11. A method as claimed in claim 1, wherein the feeding of powder is effected by using a carrier gas, preferably nitrogen, for the powder.

12. A method as claimed in claim 1, wherein the succeeding portions (12, 12') of the piston ring blank are pre- and/or post-heated continuously as the method proceeds.

13. A method as claimed in claim 12, wherein the pre- and/or post-heating of the portions (12, 12') of the piston ring is carried out at regular intervals around the circumference of the piston ring (1).

14. A method as claimed in claim 12, wherein said pre- and/or post-heating is effected by means of a plurality of heating elements (13).

15. A method as claimed in claim 12, wherein the pre- and/or post-heating is provided by means of induction.

16. A method as claimed in claim 1, wherein the piston ring blank (1) is supported by a suspension device (5) during the method.

17. A method as claimed in claim 2, wherein the piston ring blank (1) is rotated substantially on its own axis as the method proceeds.

18. A method as claimed in claim 2, wherein the width of the energy radiation substantially corresponds to the width of the piston ring blank (1).

19. A method as claimed in claim 3, wherein the width of the energy radiation substantially corresponds to the width of the piston ring blank (1).

20. A method as claimed in claim 17, wherein the width of the energy radiation substantially corresponds to the width of the piston ring blank (1).

21. A method as claimed in claim 13, wherein said pre- and/or post-heating is effected by means of a plurality of heating elements (13).

\* \* \* \* \*